2,998,284
MULTIPLE-UNIT LOCOMOTIVE BRAKE CONTROL EQUIPMENT

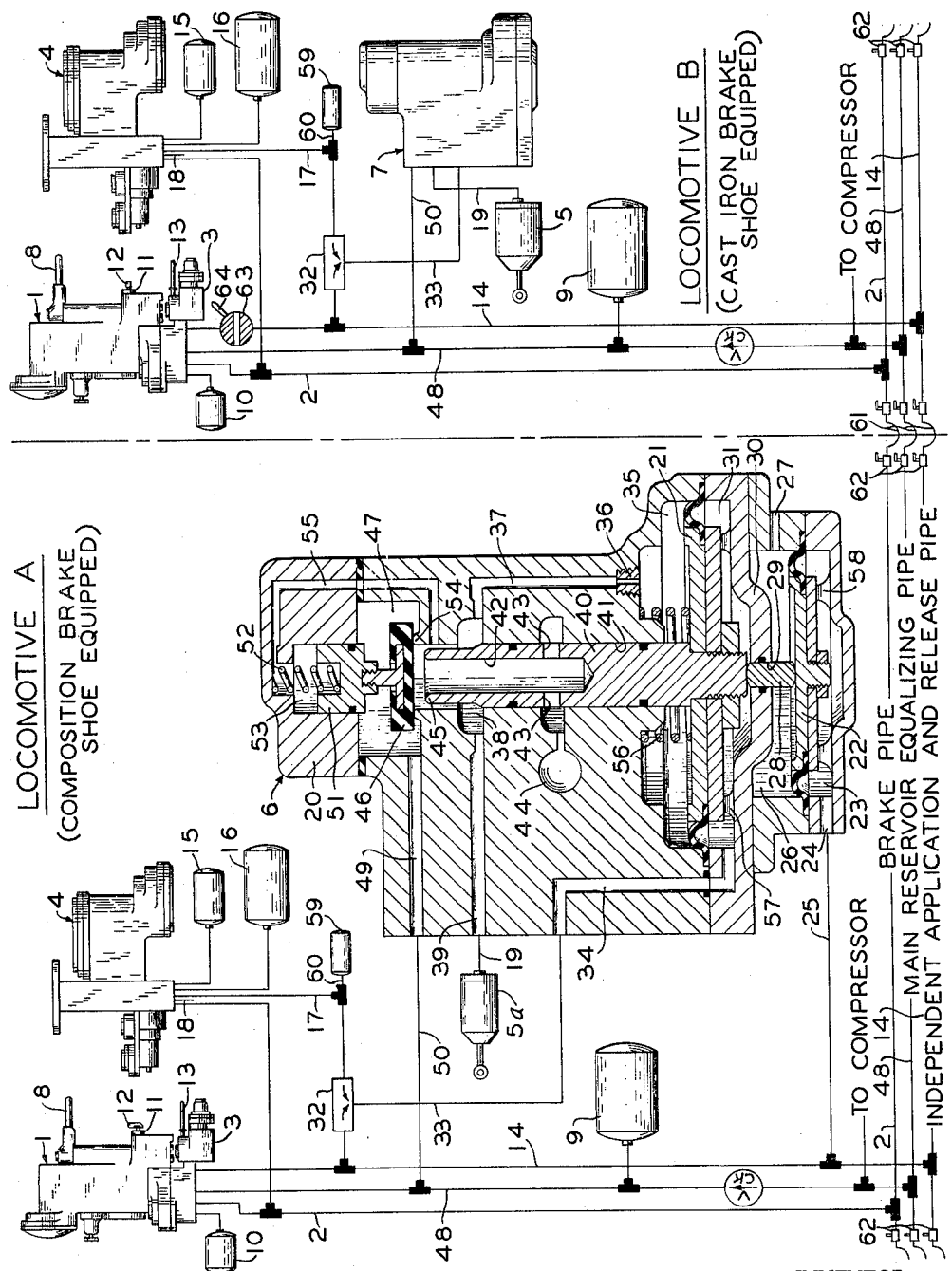

Walter B. Kirk, Pitcairn, Pa., assignor to Westinghouse Air Brake Company, Wilmerding, Pa., a corporation of Pennsylvania
Filed Aug. 24, 1959, Ser. No. 835,592
4 Claims. (Cl. 303—8)

This invention relates to multiple-unit locomotive brake control equipment and more particularly to such fluid pressure brake control apparatus for providing compatible degrees of braking on different locomotive units in a multiple-unit locomotive setup notwithstanding varying friction characteristics of the brake shoes carried by the separate locomotive units.

The term "multiple-unit locomotive," as used herein, refers to two or more separate locomotive units coupled together with the propulsion power and brakes controlled by the engineman on one unit.

Two types of brake shoes are in common use on locomotive units and cars in railway service, namely the so-called "composition" brake shoe and the more common cast iron brake shoe, having different frictional characteristics. The "composition" brake shoe, in which the brake blocks are of composition material provides a substantially higher braking force than the cast iron brake shoe per unit area, and its coefficient of friction as when applied to the tread of a wheel of a locomotive unit, remains substantially constant at all locomotive speeds. In contrast, the coefficient of friction of a cast iron brake shoe is higher at low speeds than at higher speeds.

In view of these differences in frictional characteristics, it is impractical with existing brake control apparatus to combine composition brake shoe equipped locomotive units with cast iron brake shoe equipped locomotive units for the reason that upon a brake application, the different units will be braked in varying degree according to the type of brake shoe provided thereon, resulting in undesirable locomotive brake and slack action.

In an endeavor to provide substantially equivalent braking forces on locomotive units equipped with composition brake shoes and locomotive units equipped with cast iron shoes, the composition brake shoe equipped locomotive units are provided with brake cylinders of smaller diameter than the brake cylinders customarily used on cast iron shoe equipped locomotive units, since the smaller diameter brake cylinder provides a lesser total braking force for a given unit fluid pressure acting on the brake cylinder piston. The smaller braking force thus exerted on the composition brake shoes taken with the higher coefficient of friction of the composition shoe is thus designed to provide substantially the same braking force as the lower coefficient of friction cast iron shoe with larger diameter brake cylinders at the normal high speed of travel of the locomotive units.

However, since the coefficient of friction of the cast iron brake shoe becomes higher at low wheel speeds, such as occur during switching operations, multiple-unit operation of locomotive units at low speeds is impractical with existing brake control equipment, because for an independent brake application on the locomotive units, the braking effort exerted by the cast iron shoes is substantially higher than the braking effort exerted by the composition brake shoes.

It is therefore the purpose of this invention to provide improved locomotive brake control apparatus for effecting compatible braking of locomotive units in multiple-unit operation at both high speeds and low speeds, notwithstanding that one or more of the locomotive units is equipped with composition brake shoes and the others are equipped with cast iron brakes shoes.

According to the invention, the usual locomotive brake control apparatus for locomotive units equipped with composition brake shoes is modified to include an arrangement utilizing a relay valve device capable of providing varying brake cylinder pressures, in such a manner that the relay valve device delivers substantially the same fluid pressure to the composition brake shoe equipped locomotive brake cylinders as is deliverd to the brake cylinders on cast iron shoe equipped locomotive units in response to an automatic brake application at high speeds, that is, a brake application initiated by the usual automatic brake valve and resulting from reduction of pressure in the usual brake pipe by operation of the automatic brake valve.

The arrangement including the relay valve device is further such, that when the usual independent brake valve device is operated (as it customarily is for low speed operation of locomotives) to provide an independent brake application on the locomotive units, the relay valve device on the composition brake shoe equipped locomotive units functions inherently to deliver a higher unit fluid pressure to the brake cylinders on these locomotive units, thus causing the braking force exerted on these locomotive units to be compatible, that is, substantially equivalent, to the braking force exerted by the cast iron brake shoes on locomotive units equipped therewith.

In the accompanying drawing, the single figure shows an improved locomotive brake control equipment embodying the invention.

Description

The locomotive brake control equipment embodying the invention is shown in the drawing, for purposes of illustration, associated with two locomotive units, namely, "locomotive unit A" represented as equipped with composition brake shoes, and "locomotive unit B" represented as equipped with cast iron brake shoes.

In the drawing, like components on each locomotive unit are designated by the same reference numerals for convenient reference. The brake control equipment shown comprises suitably mounted on each locomotive unit, an automatic brake valve device 1 for controlling the pressure of fluid in a brake pipe 2 that extends through the respective locomotive units and cars (not shown) if connected, so as to permit brakes on the respective locomotive units to be controlled automatically in unison with those on the connected cars of the train, an independent brake valve device 3 for controlling the brakes on the respective locomotive units independently of and separately from those on the connected cars; a brake control valve device 4 which responds to a reduction in brake pipe pressure to cause an application of locomotive brakes; respective brake cylinders 5a and 5; and respective relay valve devices 6 and 7. Relay valve device 6 is shown in disproportionately enlarged scale for clarity.

The automatic brake valve device 1 as illustratively shown is of the type fully disclosed in FIG. 1 of copending application, U.S. Serial No. 588,036, filed May 29, 1956, now Patent No. 2,905,507, granted September 22, 1959, and assigned to the asignee of the present invention; reference may be had to that application for details of structure. This brake valve device is of the self-lapping type and comprises control valve means responsive to movement of a handle 8 to a release position to connect a main reservoir 9 to an equalizing reservoir 10 for charging the latter to a preselected normal charge value and causing the brake pipe 2 to be charged correspondingly to the pressure of fluid established in the equalizing reservoir 10; and responsive to movement of handle 8 to a service braking position to effect a full service reduction in equalizing reservoir pressure and brake pipe pressure, and responsive to movement of said handle to any selected position within an application zone, defined between slow release and service positions, to provide in the equalizing reservoir fluid at a selectable pressure corresponding to the position of said handle in said zone, for causing a graduated application or a graduated release of brakes according to whether said handle is moved in the direction of said service braking position or in the reverse direction. The automatic brake valve device 1 has a cut-off valve 11 having a handle 12 which is positionable to a cut-out position for cutting off operation of the brake valve 1, and to a freight or passenger position according to usage of the locomotive unit.

The independent brake valve device 3 is illustratively shown as of the type fully disclosed in U.S. Patent 2,548,674, granted April 10, 1951 to G. T. McClure et al., and assigned to the assignee of the present invention. This brake valve device is of the self-lapping type and comprises valve means operable by movement of a handle 13 to a release position to open an independent application and release pipe 14 connected thereto and extending through the locomotive unit, to atmosphere, and operable by movement of said handle 13 from said release position into an application zone for supplying fluid from the main reservoir 9 to the independent application and release pipe 14 at a pressure proportional to the extent of such movement.

The brake control valve device 4 is preferably of the type fully shown and described in a copending application, Serial No. 693,436, filed October 30, 1957, now Patent No. 2,937,906, granted May 24, 1960 and assigned to the assignee of the present invention. Valve device 4 is connected to the brake pipe 2 via a branch of the brake pipe and comprises, briefly, reservoir charging control means and a service valve (not shown). The charging control means responds to charging of the brake pipe 2 to supply fluid under pressure from the brake pipe to a control reservoir 15 and to a supply reservoir 16, and the service valve responds to charging of the brake pipe 2 to connect an automatic application pipe 17 to a release pipe 18 and responds to a chosen reduction in brake pipe pressure from control reservoir pressure to supply fluid at a corresponding pressure from the supply reservoir 16 to pipe 17, said service valve thus being operative to provide in pipe 17 fluid at a pressure proportionate to the magnitude of the differential between brake pipe pressure and control reservoir pressure.

Brake cylinders 5a and 5 are of the type having a piston therein subject opposingly to pressure of fluid at one side from a pipe 19 and at the opposite side to the force of a return spring (not shown). The brake cylinder 5a on locomotive unit A is of a smaller diameter than brake cylinder 5 on locomotive unit B so as to provide similar braking forces on composition brake shoe and cast iron brake shoe equipped locomotive units during automatic brake applications at locomotive speeds.

The relay valve device 6 mounted on locomotive unit A comprises within a sectionalized casing 20 two coaxially arranged, spaced-apart movable abutments, illustratively shown as diaphragms 21 and 22, of different effective areas, the larger abutment 21 being above the smaller abutment 22 in stacked relation, as viewed in the drawing. The smaller abutment 22 is subject at its lower side to pressure of fluid in a chamber 23 constantly open to the independent application and release pipe 14 via a port 24 and a pipe 25, and subject at the opposite side to pressure in a chamber 26 always open to atmosphere via a port 27 through the casing wall.

Movable abutment 21 is operatively connected to the smaller movable abutment 22 through the medium of a co-axially arranged, cylindrical pusher stem 28, having sealing and slidably guided contact with the wall of an aligned bore 29 through a casing partition 30 separating chamber 26 from a chamber 31 at the lower side of abutment 21; said stem 28 at its respective ends engaging the movable abutments 21 and 22. Chamber 31 is supplied with fluid under pressure alternatively from the independent application and release pipe 14 or pipe 17 via a double check valve 32 to which the independent application and release pipe 14 and the pipe 17 are connected, and via a control pipe 33 and a passage 34 in casing 20; the double check valve 32 connecting the pipe having the higher pressure to the control pipe 33.

At the upper side of movable abutment 21 is formed a chamber 35 constantly open via a baffle choke 36, a passage 37, an annular chamber 38 in casing 20, a passage 39, and pipe 19 to the brake cylinder 5a.

Coaxially connected to the chamber 35 side of movable abutment 21 is one end of a cylindrical slide valve 40 having sealing and slidably guided contact with the wall of an aligned bore 41 in casing 20, which bore 41 is open at one end to chamber 35 and at the opposite end to chamber 38 that surrounds the other reduced diameter end of the slide valve 40 and is constantly open to passages 37 and 39. This reduced diameter end of slide valve 40 has a central bore 42 that is open at its inner end, via radial ports 43 though the wall of valve 40, to a vent port 44 and forms an annular exhaust valve 45 at its upper end.

Arranged coaxially with slide valve 40 is a disc-shaped brake cylinder supply valve 46 which controls communication between an annular supply chamber 47 in casing 20 constantly open to a main reservoir equalizing pipe 48, that extends through the locomotive unit, via a passage 49 and a supply pipe 50. Coaxially arranged with the supply valve 46 is a piston 51, sealingly slidable within a bore aligned with bore 41 and suitably secured to the supply valve 46 such as by screw-threaded connection.

Piston 51 is urged by a helical bias spring 52, disposed in a chamber 53 at the upper side of piston 51, toward the supply valve 46 for normally seating the latter against an annular seat rib 54 encircling chamber 38. Chamber 53 is constantly open to annular chamber 38 via a passage 55 so as to reflect the pressure of fluid in the brake cylinder therein. The lower face of piston 51 is always subject to the pressure of fluid in pressure supply chamber 47 and has an area equal to the seated area of supply valve 46 or the annular rib 54 so as to balance the forces of supply pressure on supply valve 46 by providing an upward force on supply valve 46 to compensate for the downward force on the valve.

A helical bias spring 56 surrounds the lower portion of slide valve 40 in chamber 35 and urges movable abutments 21 and 22 toward their lowermost positions defined by each abutment engaging respective stops 57 and 58 in casing 20. In the lowermost positions of the abutments 21 and 22, slide valve 40 is shifted correspondingly such that the exhaust valve 45 is biased away from the lower side of supply valve 46 whereby pipe 19, passage 39, chamber 38, passage 37, chamber 35, passage 55, and chamber 53 are open to atmosphere via bore 42, ports 43 and vent port 44.

Relay valve device 7 is similar to relay valve device 6 but differs therefrom in that it does not have the smaller movable abutment 22 and the cylindrical stem 28 of relay valve device 6 and in that the bore in partition 30 is closed off with partition 30 forming the outer casing wall.

A volume reservoir 59 may be connected to the automatic application pipe 17 via a branch pipe 60, as shown, if desired to provide additional volumes for the pressure chamber 31 of relay valve device 6 and similarly for the corresponding pressure chamber of relay valve 7 so as to control the rate of build-up of brake cylinder pressure, it being noted that pipe 17 is charged by way of a choke (not shown) in the brake controlling valve device 4.

The brake pipe 2, main reservoir equalizing pipe 48, and the independent application and release pipe 14 of each locomotive unit A and B are coupled each to the corresponding pipe on the other locomotive unit by flexible hoses 61. Each of these pipes 2, 48 and 14, at each respective end, are provided with cut-out cocks 62 and the cut-out cocks at the corresponding ends nearest the coupled ends of the pipes are positioned to an open position as shown in the drawing, to provide through communication of fluid pressure between the locomotive units; and those at the remote ends of the pipes are positioned in cut-out position, as shown in the drawing, to prevent the escape of fluid under pressure. If railway cars are connected to locomotive unit B then the cut-out cock 62 on the brake pipe will be in an open position to provide through communication of fluid to the cars.

A cut-out cock 63 having a handle 64 is interposed in the independent application and release pipe 14 near the independent brake valve 3 for cutting off the flow of fluid to the independent brake valve 3 on locomotive unit B when locomotive units A and B are united for multiple-unit locomotive operation as will be more fully explained later.

*Operation*

Assume initially that locomotive unit A is coupled to locomotive unit B at the brake pipe 2, the main reservoir equalizing pipe 48, and the independent application and release pipe 14 in the manner previously explained and that locomotive unit A is the controlling and lead locomotive and locomotive unit B the trailing locomotive in a multiple-unit locomotive. The multiple-unit locomotive brake control equipment is conditioned for lead-trail locomotive operation by positioning the handle 12 of cut-off valve 11 on the automatic brake valve 1 on locomotive unit A in either a freight or passenger position according to locomotive usage desired, and positioning the handle 12 of the cut-off valve 11 on the automatic brake valve 1 on locomotive unit B in a cut-off position thereby rendering the automatic brake valve 1 of locomotive unit B inoperative; and by placing the handle 64 of cut-out cock 63 in a cut-out position, as shown in the drawing for cutting out operation of the independent brake valve 3 on locomotive unit B.

If the locomotive brake control equipment is devoid of fluid under pressure, then spring 56 of relay valve device 6 on locomotive unit A will bias movable abutments 21 and 22 and slide valve 40 into their lowermost positions, as shown in the drawing, whereby chambers 35 and 38 will be vented via bore 42 and vent port 44, thus venting pipe 19 and brake cylinder 5a for causing a release of brakes; and spring 52 will bias supply valve 46 into engagement with rib 54 for cutting off flow of main reservoir fluid from supply chamber 47 to chamber 38. Since relay valve device 7 on locomotive unit B is the counterpart of relay valve device 6 with the exceptions pointed out, pipe 19 leading to the brake cylinder on locomotive unit B will be vented in the same manner via a vent port corresponding to vent port 44 of relay valve device 6 and the brakes on both locomotive units will thus be in a release position.

To initially charge the equipment the handle 8 of the automatic brake valve 1 on locomotive unit A is left in its release position and the respective main reservoirs 9 on each of the locomotive units is charged with fluid under pressure in the well-known manner, such as by a compressor, via a branch of pipe 48, pipe 48, and a check valve. Fluid under pressure will flow from the main reservoir pipe 48 on each locomotive unit to respective relay valve devices 6 and 7 via corresponding supply pipes 50; and to the automatic brake valve device 1 on locomotive unit A and by operation of said brake valve device 1 to the brake pipe 2 on each of the locomotive units for charging the latter pipes with fluid at a preselected normal charge value of pressure.

On each locomotive unit some of the fluid under pressure will also flow via a branch of the brake pipe 2 to the corresponding control valve device 4 for causing the latter to charge the corresponding control and supply reservoirs 15 and 16 to the normal charge value of pressure, and vent the corresponding pipe 17.

To effect an automatic application of brakes on the locomotive units in unison with those on the connected cars (not shown), the automatic brake valve handle 8 on locomotive unit A is moved into a service application zone an extent corresponding to the degree of application desired for causing a corresponding desired reduction in brake pipe pressure on both locomotive units. Since in an automatic brake application relay valve device 7 operates identically to relay valve device 6, the operation of the equipment on locomotive unit A only will be described for reasons of simplification but it will be understood that the operation of relay valve 7 and result obtained will be the same for locomotive unit B.

This reduction in pressure in the brake pipe 2 is transmitted to the control valve device 4 via a branch of the brake pipe 2 and control valve device 4 responds to cause fluid under pressure to flow from the supply reservoir 16 to the automatic application pipe 17, and since the independent application and release pipe 14 is ordinarily vented during an automatic brake application, then through the double check valve 32, to the control pipe 33, through passage 34, and into chamber 31 of relay valve device 6.

Fluid under pressure in chamber 31 will then act against the spring 56 to cause the movable abutment 21 to move upward thereby carrying slide valve 40 upward until the exhaust valve 45 engages the supply valve 46, thus cutting off the brake cylinder pipe 19 and chamber 38 from the vent port 44. Further movement of the slide valve 40 upward causes the exhaust valve 45 to unseat supply valve 46, against the force of spring 52, from the supply valve seat 54, and to permit main reservoir fluid pressure to flow from the chamber 47 to chamber 38 and thence to the brake cylinder pipe 19 and brake cylinder 5a resulting in an application of brakes.

Meanwhile pressure of fluid from chamber 38 will flow to the chamber 35 via passage 37 and choke 36 to act against control pipe pressure in chamber 31.

Pressure of fluid from chamber 38 will also flow to chamber 53 and act together with the force of spring 53 to force piston 51 downwardly to cause supply valve 46 to remain seated on exhaust valve 45. It will be understood that the effective area of the piston 51, subject to brake cylinder pressure in chamber 53, is equal to the cross-sectional area of the slide valve 40. Thus an area equivalent to the cross-sectional area of the slide valve 40 is added to the area at the upper face of abutment 21 to maintain a one-to-one ratio between the effective areas at opposite sides of the abutment.

When the combined force of the pressure of fluid in chamber 35, the pressure of fluid in chamber 53 and the force of spring 56 slightly exceeds the pressure of fluid in chamber 31, then movable abutment 21 will be forced downwardly, and while the slide valve 40 moves downwardly the supply valve 46 will also move downwardly seated on rib or seat 45 due to the pressure of fluid in chamber 53 and spring 52 acting on piston 51 to cause the supply valve 46 to remain seated until the slide valve 40, and therefore exhaust valve 45, move down to a point where the supply valve 46 engages rib or seat 54, thereby cutting off the flow of fluid from chamber 47 to brake cylinder 5a, while the exhaust valve 45 still remains seated against the lower side of supply valve 46, thus trapping the pressure of fluid in the brake cylinder.

It will be understood that since locomotive unit A has composition brake shoes, and composition brake shoes provide a higher braking force than cast iron brake shoes per unit area as previously pointed out, locomotive unit B having the cast iron brake shoes must be braked with a higher braking force if the locomotive units are to be braked substantially alike, and this is accomplished by providing locomotive unit B with a larger brake cylinder than the one provided on locomotive unit A.

Thus, compatible braking of locomotive units A and B and of the cars attached thereto (not shown) is accomplished during an automatic brake application.

To effect a release of an automatic application of brakes, the brake valve handle 8 on locomotive unit A is moved toward the release position an extent corresponding to the degree of release desired for causing the brake pipe 2 to be recharged to a corresponding degree. Since the brakes on both locomotive units A and B are released in the same manner, for reasons of simplification, only the release of brakes on locomotive unit A will be explained.

Upon recharging of the brake pipe 2, the branch pipe of brake pipe 2 leading to the control valve device 4 is recharged and the control valve device 4 responds to the increase in pressure of fluid to vent the automatic application pipe 17 via release pipe 18, and thereby vent control pipe 33, passage 34 and chamber 31. The pressure of fluid in chamber 35 and the force of spring 56 will then move movable abutment 21 downwardly, thus carrying slide valve 40 downwardly and causing the exhaust valve 45 to unseat from the supply valve 46. When exhaust valve 45 becomes unseated, pipe 19 and brake cylinder 5a are vented via bore 42 and vent port 44, thus causing a release of brakes on the locomotives. Relay valve device 7 on locomotive unit B acts similarly to release fluid under pressure from brake cylinder 5 on that locomotive unit.

To effect an application of locomotive brakes independently of those on the connected cars, the independent brake valve handle 13 on locomotive unit A is moved into the application zone for providing in the independent application and release pipe 14 on both locomotive units fluid at a pressure corresponding to the degree of brake application desired, which pressure must be in excess of any pressure then existing in the respective automatic application pipes 17 on each locomotive unit so that the respective double check valves 32 will operate to connect pipes 14 rather than the pipes 17 to the control pipe 33.

The pressure of fluid from the independent application and release pipe 14 on each of the locomotive units flows through the respective double check valves 32, to the relay valve devices 6 and 7 via corresponding pipes 33. The relay valve device 7 on locomotive unit B operates in the same manner as was described for the automatic application of brakes to supply fluid under pressure to the brake cylinder pipe 19 and brake cylinder 5 to cause an application of brakes on locomotive unit B. Since locomotive unit B has the cast iron brake shoes and since the coefficient of friction of these shoes increases as the locomotive speed decreases, locomotive unit B will be braked at a higher braking ratio at the lower speeds.

To compensate for this increase in braking force on locomotive unit B, fluid from the independent application and release pipe 14 on locomotive unit A not only flows to the control pipe 33 and to chamber 31 underneath the larger movable abutment 21 via the double check valve 32 as described for an automatic application of brakes, but also flows to chamber 23 underneath the smaller movable abutment 22 via pipe 25. Since chamber 26 at the upper side of abutment 22 is bented to atmosphere via port 27 and the smaller movable abutment 22 is connected to the larger movable abutment 21 through the stem 28, the force acting to move the movable abutments 21 and 22 upward for carrying slide valve 40 upward, against the force of spring 56, is the combined upward forces of the pressure of fluid acting on the movable abutment 21 in chamber 31 and the pressure of fluid acting on the small movable abutment 22 in chamber 23. Upward movement of slide valve 40 will unseat supply valve 46 against the force of spring 52 to permit main reservoir fluid from chamber 47 to flow to pipe 19, chamber 53 and chamber 35 simultaneously. Since it will take more pressure of fluid acting in chamber 35 to move the large and small movable abutments downward than during an automatic brake application, more pressure of fluid will flow to the pipe 19 and brake cylinder 5a via chamber 38 for producing a higher braking force than would be produced by the use of the large movable abutment solely before main reservoir fluid is cut off from chamber 38 as when the slide valve 40 is biased to a downward position where the supply valve 46 seats on rib 54. Thus during an independent brake application it will be noted that locomotive unit A is braked by an additional force corresponding to the force of the pressure of fluid acting on the small diaphragm 22 in chamber 23 so as to compensate for the proportionate increase in the coefficient of friction developed by the cast iron brake shoes on locomotive unit B when all the locomotive units are braked at slow speeds.

To effect a release of brakes on the locomotive units, the independent brake valve handle 13 on locomotive unit A is moved into a brake release position thereby opening the independent application and release pipes on both locomotive units to atmosphere and thus causing venting of pipe 25 on locomotive unit A and of respective pipes 33, pipes 19, and brake cylinders 5a and 5 on the locomotive units, to cause a release of brakes on all of the locomotive units.

Having now described the invention, what I claim as new and desire to secure by Letters Patent, is:

1. Brake control equipment for a multiple-unit locomotive of the type wherein at least one of the locomotive units has composition brake shoes having a substantially constant coefficient of friction at all locomotive speeds and the remainder have cast iron brake shoes having a coefficient of friction which increases as the locomotive speed decreases, said equipment including on each of the locomotive units a brake pipe normally charged with fluid at a certain uniform pressure, an automatic brake valve device for effecting the reduction of fluid pressure in said brake pipe from said certain uniform pressure, an automatic application pipe, a control valve device responsive to reduction from the said certain uniform pressure in said brake pipe for establishing a fluid pressure in said automatic application pipe corresponding in degree to the extent of reduction from the said certain uniform pressure of fluid in said brake pipe, and independent application and release pipe, an independent brake valve device for establishing in said application and release pipe a selected pressure corresponding to the degree of independent application of locomotive brakes desired, a brake cylinder, a control pipe, a double check valve operative to selectively connect said automatic application pipe or said independent application and release pipe to said control pipe according to which of said pipes is charged to the higher pressure, a relay valve device on each cast iron brake shoe equipped locomotive unit having a single movable abutment therein, subject on one side to the pressure of fluid in said control pipe and on its other side to the pressure of fluid in the said brake cylinder on the corresponding locomotive unit, for operatively supplying fluid to the brake cylinder on the corresponding locomotive unit at a pressure substantially equal to the pressure of fluid in said control pipe, and a relay valve means for each composition brake shoe equipped locomotive unit, said relay valve means having a pair of movable abutments operatively connected to each other, one of said pair of abutments being subject on one side to the pressure of fluid in said control pipe and on its other side to the pressure of fluid in said brake cylinder on the corresponding locomotive unit, and the other of said pair of abutments being subject on one side to pressure of fluid in said independent application and release pipe and on its other side to atmospheric pressure, said relay valve device and relay valve means being operable concurrently, at one time, in response to charging of said control pipe from the automatic application pipe with fluid under pressure to supply fluid under pressure to each respective brake cylinder at a value substantially equal to the pressure of fluid in the control pipe and being operable concurrently at another time in response to charging of the control pipe on each locomotive unit from the corresponding independent application and release pipe, said relay valve device to supply fluid under pressure to its respective brake cylinder at a value corresponding to the pressure of fluid in said control pipe acting on the one side of said single abutment and said relay valve means to supply fluid under pressure to its respective brake cylinder at a value equal to the cumulative force of the pressure of fluid in said control pipe acting on one of said pair of abutments and the pressure of fluid in said independent application and release pipe acting on the other of said pair of abutments, whereby the braking of the cast iron brake shoe equipped locomotive unit and of the composition brake shoe equipped locomotive unit is effected at substantially the same degree.

2. Brake control equipment, as claimed in claim 1, further characterized in that the said brake cylinder on the composition brake shoe equipped locomotive unit has a brake cylinder piston of smaller effective pressure area than does the brake cylinder on the cast iron brake shoe equipped locomotive unit so as to provide compatible degrees of braking on these units notwithstanding difference in the coefficient of friction of the brake shoes on the locomotive units.

3. Brake control equipment for locomotive units of the type equipped with composition brake shoes having a substantially constant coefficient of friction at all locomotive speeds, said equipment comprising a brake pipe normally charged with fluid at a certain uniform pressure, an automatic brake valve device for effecting the reduction of fluid pressure in said brake pipe from said certain uniform pressure, an automatic application pipe, a control valve device responsive to reduction from the said certain uniform pressure in said brake pipe for establishing a fluid pressure in said automatic application pipe corresponding in degree to the extent of reduction from the said certain uniform pressure of fluid in said brake pipe, an independent application and release pipe, an independent brake valve device for establishing in said application and release pipe a selected pressure corresponding to the degree of independent application of locomotive brakes desired, a brake cylinder, a control pipe, a double check valve operative to selectively connect said automatic application pipe or said independent application and release pipe to said control pipe according to which of said pipes is charged to the higher pressure, and a relay valve means having a pair of movable abutments operatively connected to each other, one of said abutments being subject on one side to the pressure of fluid in said control pipe and at its other side to the pressure of fluid in said brake cylinder on the corresponding locomotive unit, and the other abutment being subject on one side to pressure of fluid in said independent application and release pipe and on its other side to atmospheric pressure, said relay valve means being operable at one time, in response to charging of said control pipe from the automatic application pipe with fluid under pressure to act on said one abutment to supply fluid under pressure to said brake cylinder at a value substantially equal to the pressure of fluid in the control pipe for braking the locomotive with a corresponding degree of braking force, and said relay valve means being operable at another time in response to charging of said control pipe from said independent application and release pipe with fluid under pressure and the consequent action of said fluid pressure on the one side of said one and the one side of said other movable abutments to cause operation of the relay valve means to supply fluid under pressure to said brake cylinder at a value substantially equal to the combined forces of fluid pressure on both of said abutments for braking the locomotive with a correspondingly higher degree of braking force than at said one time.

4. Brake control equipment for locomotive units of the type equipped with cast iron brake shoes having a coefficient of friction which increases as the speed of the locomotive decreases, said equipment comprising a brake pipe normally charged with fluid at a certain uniform pressure, an automatic brake valve device for effecting the reduction of fluid pressure in said brake pipe from said certain uniform pressure, a control valve device, an automatic application pipe, a control reservoir and a supply reservoir both chargeable with pressure under fluid from said brake pipe through said control valve device, the latter being responsive to reduction from said certain uniform pressure in said brake pipe below the pressure of fluid in said control reservoir for establishing a fluid pressure in said automatic application pipe from said supply reservoir corresponding in degree to the extent of reduction from the said certain uniform pressure of fluid in said brake pipe, an independent application and release pipe, an independent brake valve device for establishing in said application and release pipe a selected pressure corresponding to the degree of independent application of locomotive brakes desired, a brake cylinder, a control pipe, a main reservoir independently charged with fluid under pressure, a double check valve operative to selectively connect said automatic application pipe or said independent application and release pipe to said control pipe according to which of said pipes is charged to the higher pressure, and a relay valve device having a movable abutment therein subject on one side thereof to the pressure of fluid in said control pipe and on its other side to the pressure of fluid in said brake cylinder, said relay valve device being operable upon charging of said control pipe alternatively from either said automatic application pipe or said independent application and release pipe with fluid under pressure active on said one side of said movable abutment to supply fluid under pressure to said brake cylinder from said main reservoir at a pressure corresponding to the pressure of fluid in either said automatic application pipe or said independent application and release pipe.

References Cited in the file of this patent

UNITED STATES PATENTS

| | | |
|---|---|---|
| 2,279,392 | Farmer | Apr. 14, 1942 |
| 2,699,972 | Burriss | Jan. 18, 1955 |